Patented Dec. 7, 1943

2,335,909

UNITED STATES PATENT OFFICE 2,335,909

ROSIN COMPOSITION

Joseph N. Borglin, Wilmington, Del., assignor to Hercules Powder Company, Wilmington, Del., a corporation of Delaware No Drawing. Application December 19, 1942, Serial No. 469,554

11 Claims. (Cl. 106—218)

This invention relates to an improvement in rosin compositions and a method for their production. More particularly, it concerns a method of treating wood rosin for the prevention of crystallization thereof, and the resulting product.

Heretofore, it has been well known that wood rosin has a tendency to crystallize and will generally crystallize in time. Such crystallization is particularly prevalent when the rosin is stored, or when it is compounded with other materials as, for example, in core oils, varnishes, printing ink and the like. The presence of crystals in wood rosin is objectionable since the crystallized rosin has a higher melting point than has uncrystallized rosin, and may enter into reaction with other materials more slowly than does uncrystallized rosin. Furthermore, this tendency to crystallize will, in many instances, cause the rosin to crystallize out of a rosin composition wherein the rosin is present in solution.

Now, in accordance with this invention, there has been found a convenient and economical method of destroying the tendency of wood rosin to crystallize and preparing a rosin composition substantially resistant to crystallization. This wood rosin is particularly of value in rosin compounds such as in core oils, varnishes, printing ink, etc., wherein the tendency of the wood rosin to crystallize out of these type compositions is particularly disadvantageous. Thus, the process of this invention comprises adding to wood rosin from about 0.3% to about 15% of a dammar gum. There is thus prepared, a rosin composition, substantially resistant to crystallization, which comprises wood rosin having from about 0.3% to about 15% of a dammar gum incorporated therewith.

Now, having indicated in a general way, the nature and purpose of this invention, the following examples will illustrate the invention. It is to be understood, however, that such examples are presented merely as illustrative of the invention and are not to be construed as limiting the same. In the examples, the ingredients are given in parts by weight unless otherwise indicated.

Example 1

Three tenths part of bold scraped Batu gum (an East India dammar) was added to 100 parts of K wood rosin and the mixture blended by heating at 150° C. for about 90 minutes under a nitrogen atmosphere. The resulting rosin composition was substantially resistant to crystallization.

Example 2

Two parts of Singapore dammar were added to 100 parts of K wood rosin and blended according to the method of Example 1. The resulting rosin composition was substantially resistant to crystallization.

Example 3

One part of Batavia dammar was added to 100 parts of K wood rosin and blended according to the method of Example 1. The resulting rosin composition was substantially resistant to crystallization.

Example 4

Forty parts of I wood rosin, two parts dammar gum and 30 parts linseed oil were heated to 150° C. to complete solution. The solution was then diluted with 30 parts kerosene, and allowed to stand at room temperature in a stoppered oil bottle. The resulting composition, particularly adapted for use as a core oil was substantially resistant to crystallization.

Example 5

Ninety parts of WG wood rosin and thirteen and one-half parts of dammar gum were dissolved in 80 parts of narrow range gasoline by warming to 60° C., under reflux. The solution was allowed to cool to 25–30° C. and was resistant to crystallization on standing.

The above examples illustrate the preparation of the improved rosin composition of this invention comprising wood rosin, and from about 0.3 to about 15% of a dammar gum based on the weight of the rosin.

As shown in the examples, such compositions may be prepared by blending wood rosin and the dammar gum at such a temperature as will provide complete dispersion of the dammar gum in the rosin. The specific time employed will be determined by such factors as the melting point, miscibility of the rosin and dammar gum, etc. In the examples, the rosin and dammar were blended at a temperature of 150° C. but in general any temperature within the range from about 100° C. to about 200° C. will be suitable. As shown in the examples, the blending operation may be carried out in the presence of an inert atmosphere such as nitrogen or carbon dioxide. The wood rosin and dammar gum may be blended in solution in a suitable solvent. This solvent may be the one in which the composition is utilized. The blending of rosin and dammar gum may also be carried out simultaneously with the preparation of additional compositions, for example, in core oil, etc.

The dammar gums which have been found effective in carrying out this process include Batavia dammar, Singapore dammar, pale dammar, bold pale East India Macassar dammar, black bold scraped East India dammar, bold scraped Batu gum (East India dammar), and the like. The amount of dammar may vary from about 0.3% to about 15% based on the weight of the rosin used, but preferably is from about 1.0% to about 10%.

Although in the examples K wood rosin has been used, the process of this invention is equally applicable to the various grades of wood rosin.

In carrying out the process of this invention, rosin, such as K wood rosin, and from about 0.3% to about 15% of a dammar gum, such as for example Batavia dammar, may be heated together at a temperature of preferably about 150° C. for a suitable period until the dammar gum becomes completely dispersed in the rosin. If desired, the blending operation may be carried out in the presence of an inert atmosphere such as nitrogen or carbon dioxide. The resulting rosin compositon is substantially resistant to crystallization.

If desired, the rosin composition may be stored in solid form, or it may be dissolved in a suitable solvent such as acetone, ethers, esters, ethanol, gasoline, hexane, benzene, ethylene dichloride, turpentine, special hydrocarbon solvents such as "Solvessos," etc.

Another alternate method of incorporating a dammar gum with rosin is by means of a solvent. Suitable solvents such as acetone, ethers, esters, ethanol, gasoline, hexane, benzene, ethylene dichloride, turpentine, special hydrocarbon solvents such as "Solvessos," etc. may be employed. The amount of solvent to be used will depend upon the particular solvent chosen, upon the viscosity desired in the final mixture and upon other facts. In general, the ratio of rosin to solvent will range from about 3:1 to about 1:5 based upon the weight of the rosin. However, if desired, other methods of incorporating the dammar gum in the wood rosin may be used. The rosin composition may be compounded with other materials as, for example, in core oils, varnishes, printing ink, etc. or the rosin and dammar may be added separately in these uses.

The rosin compositions prepared by the method of this invention have many important uses. Generally speaking, a rosin composition in which from about 0.3% to about 15% of dammar gum has been added to wood rosin may be used not only wherever wood rosin may be used, but in addition, may be used where a wood rosin substantially resistant to crystallization is desired. Crystallization difficulties heretofore prevalent when wood rosin was used are eliminated. Wood rosin which has been treated with dammar gum, according to the process of this invention, posseses all of the normal physical properties of ordinary wood rosin. Thus, the tendency of the wood rosin toward crystallization has been substantially reduced or removed without materially affecting the normal physical properties of the wood rosin.

What I claim and desire to protect by Letters Patent is:

1. A rosin composition substantially resistant to crystallization comprising wood rosin having from about 0.3% to about 15% of a dammar gum incorporated therewith based on the weight of the rosin.

2. A rosin composition substantially resistant to crystallization comprising wood rosin having from about 1.0% to about 10% of a dammar gum incorporated therewith based on the weight of the rosin.

3. A rosin composition substantially resistant to crystallization comprising wood rosin having from about 1.0% to about 10% of bold scraped Batu gum incorporated therewith based on the weight of the rosin.

4. As a new article of manufacture, a solid wood rosin product substantially resistant to crystallization and containing from about 0.3% to about 15% of a dammar gum based on the weight of the rosin.

5. As a new article of manufacture, a solid wood rosin product substantially resistant to crystallization and containing from about 1.0% to about 10% of a dammar gum based on the weight of the rosin.

6. As a new article of manufacture, a solid wood rosin product substantially resistant to crystallization and containing from about 1.0% to about 10% of a dammar gum based on the weight of the rosin, said amount of dammar gum being insufficient to change the normal physical properties of the wood rosin.

7. As a new article of manufacture, a solid wood rosin product substantially resistant to crystallization and containing from about 1.0% to about 10% of Batavia dammar based on the weight of the rosin, said amount of dammar gum being insufficient to change the normal physical properties of the wood rosin.

8. A composition substantially resistant to crystallization comprising wood rosin, from about 0.3% to about 15% of a dammar gum based on the weight of the rosin, and a solvent.

9. A composition substantially resistant to crystallization comprising wood rosin, from about 0.3% to about 15% of a dammar gum based on the weight of the rosin, and a solvent, the ratio of rosin to solvent being from about 3:1 to about 1:5.

10. A composition substantially resistant to crystallization comprising wood rosin, from about 1.0% to about 10% of a dammar gum based on the weight of the rosin, and a solvent, the ratio of rosin to solvent being from about 3:1 to about 1:5.

11. A composition substantially resistant to crystallization comprising wood rosin, from about 1.0% to about 10% of Singapore dammar based on the weight of the rosin, and a solvent, the ratio of rosin to solvent being from about 3:1 to about 1:5.

JOSEPH N. BORGLIN.